US012644480B2

(12) United States Patent (10) Patent No.: US 12,644,480 B2

Bevilaqua Santana (45) Date of Patent: Jun. 2, 2026

(54) DEVICE FOR REMOVING MISALIGNMENTS BETWEEN FLANGES

(71) Applicant: PETRÓLEO BRASILEIRO S.A.—PETROBRAS, Rio de Janeiro (BR)

(72) Inventor: Andre Luiz Bevilaqua Santana, Macaé (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 303 days.

(21) Appl. No.: 18/489,068

(22) Filed: Oct. 18, 2023

(65) Prior Publication Data

US 2024/0133406 A1 Apr. 25, 2024
US 2024/0229840 A9 Jul. 11, 2024

(30) Foreign Application Priority Data

Oct. 19, 2022 (BR) ........................... 1020220212465

(51) Int. Cl.
*F16B 5/02* (2006.01)
*F16B 37/04* (2006.01)

(52) U.S. Cl.
CPC .............. *F16B 5/025* (2013.01); *F16B 37/04* (2013.01)

(58) Field of Classification Search
None
See application file for complete search history.

(56) References Cited

U.S. PATENT DOCUMENTS

| | | | | | |
|---|---|---|---|---|---|
| 4,685,188 | A | * | 8/1987 | Goy ......................... | B23P 11/02 403/14 |
| 2015/0050079 | A1 | * | 2/2015 | Huster .................... | F16D 1/033 29/888.09 |
| 2019/0001473 | A1 | * | 1/2019 | Harper .................... | B25B 27/16 |

FOREIGN PATENT DOCUMENTS

| | | | |
|---|---|---|---|
| BR | 112019005940 | B1 | 6/2022 |
| EP | 2895778 | A4 | 6/2016 |
| RU | 212070 | U1 | 7/2022 |

* cited by examiner

*Primary Examiner* — Daniel J Wiley

(74) *Attorney, Agent, or Firm* — Troutman Pepper Locke LLP

(57) ABSTRACT

A device for removing misalignments between flanges of pipeline ends. More specifically, a device that, operated by an ROV, allows flange holes at the ends of subsea pipelines to be aligned so that interconnection operations between said pipelines can be embodied. To this end, the device described herein comprises an elongated metallic body having at least two diameters and presenting a gradual reduction between the component diameters. Additionally, a fixed nut is mounted on the larger diameter side of the elongated body, followed by a manipulator for administration by the ROV. On the other hand, a movable nut is mounted on the smaller diameter side of the elongated body, and the tightening movement made by the ROV on this movable nut causes the device to pass through the holes to be aligned, precisely, in the direction of the larger diameter of the device of the invention.

20 Claims, 2 Drawing Sheets

DEVICE FOR REMOVING MISALIGNMENTS BETWEEN FLANGES

CROSS-REFERENCE TO RELATED APPLICATION

This application claims, under 35 U.S.C. 119(a), priority to and the benefit of Brazilian Patent Application No. 10 2022 021246 5, filed Oct. 19, 2022, which is incorporated by reference herein in its entirety.

FIELD OF APPLICATION

The present invention pertains to the field of the devices operable in a subsea environment, especially adapted for operations of joining pipelines in subsea environments and, more specifically, to the field of tools operable by an ROV, Remoted Operated Vehicle, or remotely operated vehicle, to enable the connection between subsea pipelines.

STATE OF THE ART

Deep water exploration systems comprise true subsea cities consisting of various equipment and a plurality of interconnected pipelines, in order to promote the necessary connections for the desired subsea activities. In practice, the structures that make up subsea cities are large structures, with several interdependent equipment, which are coordinated to carry out complex tasks. Consequently, it is possible to imagine that there are recurring maintenance needs for this equipment, as well as the reordering of such equipment. Obviously, it is increasingly desirable that all actions on subsea systems are carried out precisely, safely and assertively. In this sense, the subsea operations with ROV are an ideal way to achieve these objectives.

In particular, in subsea operations that aim at interconnecting flanged pipelines, a subsea interconnection tool is used to bring said pipelines together. However, this approach step is faced with a consequent misalignment between the flanged connections of the pipelines to be interconnected. To make the interconnection embodiment possible, it is essential that the radial and/or longitudinal misalignments of the flange holes are removed.

In the state of the art, some tools are found that mention possibilities for alignments between flanges. For example, document EP2895778A4 describes a flange capture, alignment and closure tool (10) designed to facilitate the tying of spools and other similar mechanical assemblies that utilize a bolted flange for installation, for example, in subsea pipelines. The tool (10) has an elongated support member (12) having a locating pin (14) mounted adjacent to one end, with its longitudinal axis (16) substantially parallel to a longitudinal axis (18) of the support member (12). A sliding assembly (20) is slidably mounted to the support member (12) and has a movable drift pin (22) provided in connection therewith. In use, when the locating pin (14) is located in a screw hole in a first flange, a second flange may be partially aligned with the first flange by engaging with the support member (12) and the drift pin (22) can be inserted into a corresponding screw hole on the second flange to align the two flanges. In this way, it is noted that document EP2895778A4 mentions the objective of correcting misalignments between flange holes, in a subsea environment, and mentions the possibility of adaptations to facilitate connections made by ROVs. However, unlike the tool proposed in the present invention, that is, a single device in a uniquely structured elongated metallic body having a larger diameter and smaller diameter with a gradual reduction, document EP2895778A4 presents a very different physical structure in the sense of consisting of a series of elements that are not arranged in series, as in the present invention. A technician skilled on the subject would not be led to make adaptations that would allow him/her to achieve the features of the device of the present invention, in particular, an elongated metallic body having a larger diameter and a smaller diameter with a gradual reduction, a fixed nut on the larger diameter side of the elongated body and a movable nut on the smaller diameter elongated body, with a manipulator for an ROV to work on this tool replacing the diver's functions. Therefore, it is clear that the tool described in EP2895778A4 is completely different from the device of the present invention, which, consequently, results in a completely different way of promoting the alignment between flanges.

Additionally, the state of the art comprises document RU212070U1, which describes a device for use in assembling components comprising flanges. The device works by centering holes in a flanged connection. Particularly, a wheel (1) is connected to a rod (2) with a thread capable of rotation. The rod (2) is provided with a reference point (3) welded to the rod (2). A set (4) with fixing screw is fixed to a cross member (5) to promote the flange opening assembly. Again, like document EP2895778A4, this second discussed document presents a completely different structure to the proposed invention. Clearly, there would be no motivation for a technician skilled on the subject to achieve the present invention based on the description provided by RU212070U1. In particular, there is no suggestion in this document about a single device in a uniquely structured elongated metallic body having a larger diameter and smaller diameter with a gradual reduction, a fixed nut on the larger diameter side of the elongated body and a movable nut on the smaller diameter elongated body, with a manipulator for an ROV to work safely and precisely on this tool, replacing the diver's functions in the subsea environment.

Finally, the state of the art includes the proposal of a traction and alignment system for components with flanges, described in document BR112019005940B1. In this document, a pulling device (32) is supported by a union of the flange of each pair to be connected. An elongated and flexible pulling link (34) extends between the flange unions of the pair and is engaged and movable with respect to the pulling device to act under stress between these flange joints. Each flange union is a flange extension comprising an arm cantilevered from a mount to extend beyond the flange and to maintain the traction connection outside the flange. The traction connection is a hinged rod comprising a longitudinal series of rigid elements (46), each of these elements being pivotally coupled to at least one other of these elements. In particular, BR112019005940B1 is characterized by a set of component parts integrated in the form of a system, unlike the linear arrangement feature proposed in the present invention. Like the documents discussed above, this third document is not able to describe or suggest in the expected way: the uniquely structured elongated metallic body having a larger diameter and smaller diameter with a gradual reduction, a fixed nut on the larger diameter side of the elongated body and a movable nut on the smaller diameter elongated body, with a manipulator for the ROV to work on this tool replacing the diver's functions.

Therefore, it is clear that the state of the art entirely lacks a tool linearly constructed by components in series, to be handled by an ROV, and capable of acting in the removal of misalignments found between flanged connections of pipelines being interconnected in a subsea environment.

SUMMARY OF THE INVENTION

The present invention relates to a device for removing misalignments between flanges that corrects radial misalignments or longitudinal misalignments identified between the holes of flanges at the ends of two pipelines, comprising an elongated body consisting of a larger diameter and, oppositely, of a smaller diameter, wherein the end that terminates the elongated body in the smaller diameter is provided with threads that receive a movable element, whereas the end that terminates the elongated body in the larger diameter receives a fixed element.

Preferably, the larger diameter of the elongated body coincides with, or is as close as possible to, the diameter of a hole in a flange of a pipeline to be interconnected, whereas its smaller diameter is, preferably, half of the larger diameter.

Furthermore, in the present invention, the change from the larger diameter to the smaller diameter of the elongated body is preferably made to the central region of said body, by a gradual reduction, preferably conical in shape.

In a preferred embodiment of the invention, the movable element is preferably a movable nut, whereas the fixed element is preferably a fixed nut.

Additionally, the device of the invention comprises a manipulator in the form of a bar, preferably being the means by which an ROV is capable of handling said device in a subsea environment, the manipulator being arranged immediately after the fixed element. Together, the fixed element and the manipulator occupy less than half the length of the larger diameter of the elongated body.

In the preferred embodiment described in the present invention, the device disclosed herein is inserted through the diameter of a hole in a first flange, initially by its smaller diameter without positioning the movable element, in order to find a corresponding hole in the flange of the second pipeline to be interconnected, wherein the mobile element is inserted into the minimum available portion of the smaller diameter after passing through the two holes of the flanges to be interconnected, the mobile element being torqued by an ROV until the two holes of the flanges to be interconnected are positioned at the larger diameter of the elongated body.

DETAILED DESCRIPTION OF THE INVENTION

The present invention relates to a device for removing misalignments between flanges 1 of pipeline ends. More precisely, the present invention provides a device 1 that, operated by an ROV, allows holes in flanges of subsea pipelines to be aligned so that interconnection operations between said pipelines can be embodied.

In practice, once the need to promote the interconnection between two determined pipelines in a subsea environment has been identified, a pipeline connection tool acts by bringing the pipelines together. With the approach made, it is expected that there will be a misalignment between the flange holes at each end of the pipeline. At this point, what the present invention provides is applicable: a device 1 that makes it possible to correct radial misalignments and/or longitudinal misalignments identified in interconnection operations between pipelines.

Figure 1:
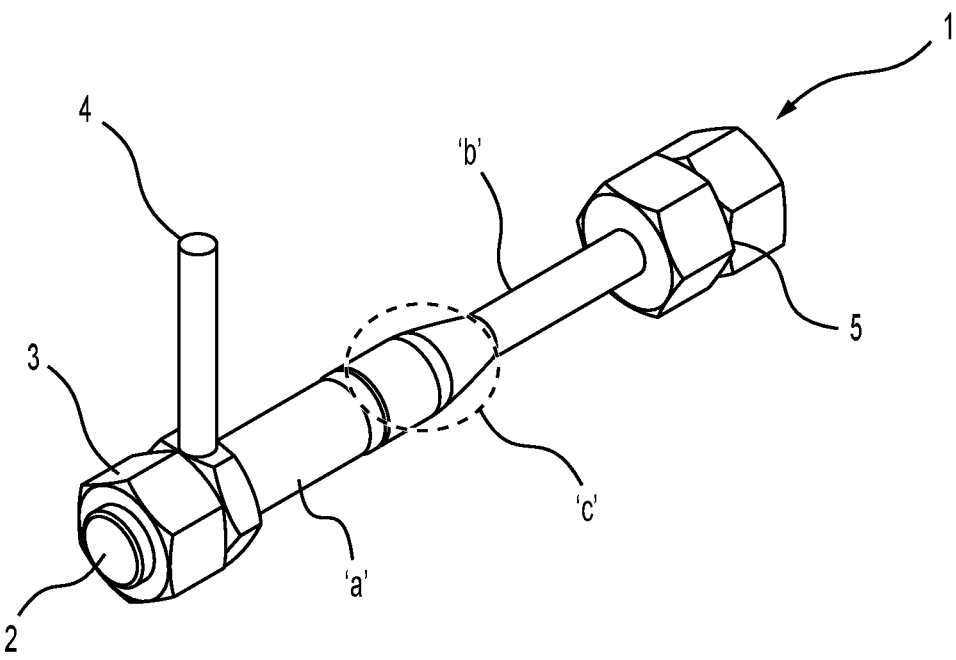
FIG. 1 is a perspective illustration of the device for removing misalignments between flanges provided by the present invention.

FIG. 1 corresponds to a graphic representation in perspective of the device for removing misalignments between flanges 1 of the present invention.

In particular, the disclosed device 1 is entirely made of a metallic material, such as, by way of example, ASTM A320 steel. Furthermore, before specifically describing the component parts of the device 1 of the invention, it is important to highlight that the device described here can be adapted in relation to its measurements to suit different sizes of flanges, pipelines, holes, maintaining the same concepts discussed herein. Therefore, the disclosed device 1 should not be interpreted exclusively in light of a specific size, but as a tool designed to meet the widest range of measurements, upon the embodiment in a suitable size, following the same coordinates described in this specification. Notwithstanding, with the aim of exemplifying an ideal condition for the embodiments of the invention, it is possible to note that a larger diameter identified in the inventive device must coincide with, or be as close as possible to, the diameter of the hole of the flange of the pipeline to be interconnected. Still preferably, a smaller diameter identified in the device of the invention should be significantly, for example, half, of the larger diameter of the identified device.

In a preferred embodiment, such as that represented in FIG. 1, arrangement 1 of the present invention comprises a series of elements designed to interact with each other mounted or positioned in series, along a common axis. This feature of the invention contributes to facilitating the misalignment correction operation performed by an ROV, completely remotely, eliminating the need, and the previous obligation, for a diver to embody interconnection operations between subsea pipelines.

Preferably, the device 1 of the invention comprises an elongated body 2. The elongated body 2 consists of an initial diameter, referenced by the larger diameter 'a', and, additionally, in the region opposite the larger diameter 'a', the elongated metallic body 2 consists of a smaller diameter 'b'. The end that terminates the elongated body 2 in the larger diameter 'a' and the end that terminates the elongated body 2 in the smaller diameter 'b' are provided with threads. In the preferred embodiment of the invention, the change from one diameter to another diameter occurs precisely in the central region of the elongated body 2. Notwithstanding, it should be noted that, depending on the characteristics of the flanges of the pipelines to be interconnected, the change in diameter may be arranged in the region that favors the characteristic of that specific flange.

As the device 1 of the present invention aims at removing misalignments, wherein this operation can be performed remotely through the action of an ROV, the change in diameter from the larger diameter 'a' to the smaller diameter 'b' is done by means of a gradual reduction 'c'. Said gradual reduction 'c' allows the insertion of the device through the holes in the flanges of the pipelines to be interconnected to be free from undesirable frictions or barriers, and for that having, for example, a conical shape. More details about the tool sliding through the flange holes will be addressed to in the following lines.

Figure 2:
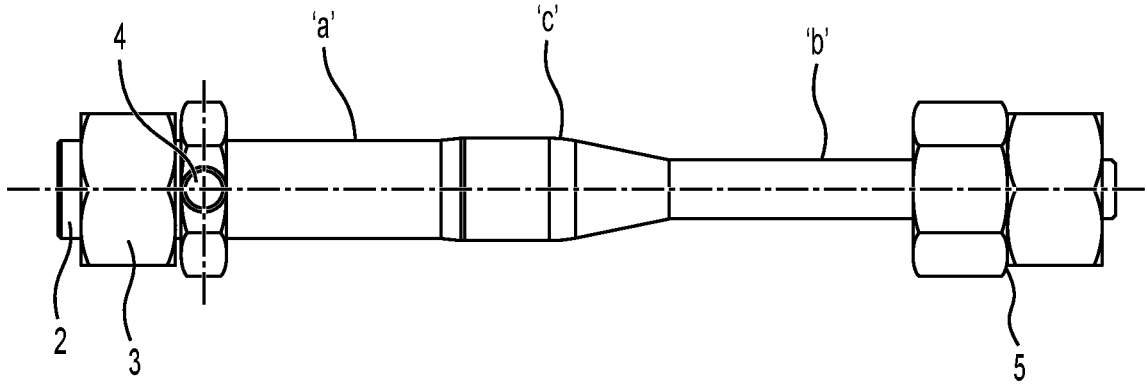
FIG. 2 is a graphic representation in top view of the device for removing misalignments between flanges provided by the present invention.

Additionally, the device 1 of the invention comprises a fixed element, preferably in the form of a fixed nut 3, located at the end that terminates the larger diameter portion 'a' of the elongated body 2. Immediately after the fixed nut 3, additionally a manipulator 4 is fixed, which is the means by which the ROV handles the device 1. Again, referring to FIGS. 1 and 2, it is possible to observe that the region in which the fixed nut 3 and the manipulator 4 are arranged occupies less than half of the length of the larger diameter portion 'a', consequently leaving more than half the length of the larger diameter free to pass through the hole of the flanges to be interconnected.

At the end that terminates the smaller diameter portion 'b', in turn, a movable element 5 is arranged, preferably in the form of a movable nut 5 that, when tightened by the ROV, promotes a force to cause the passage of the device through the holes of the flanges to be aligned, enabling effective alignment.

Figure 3:
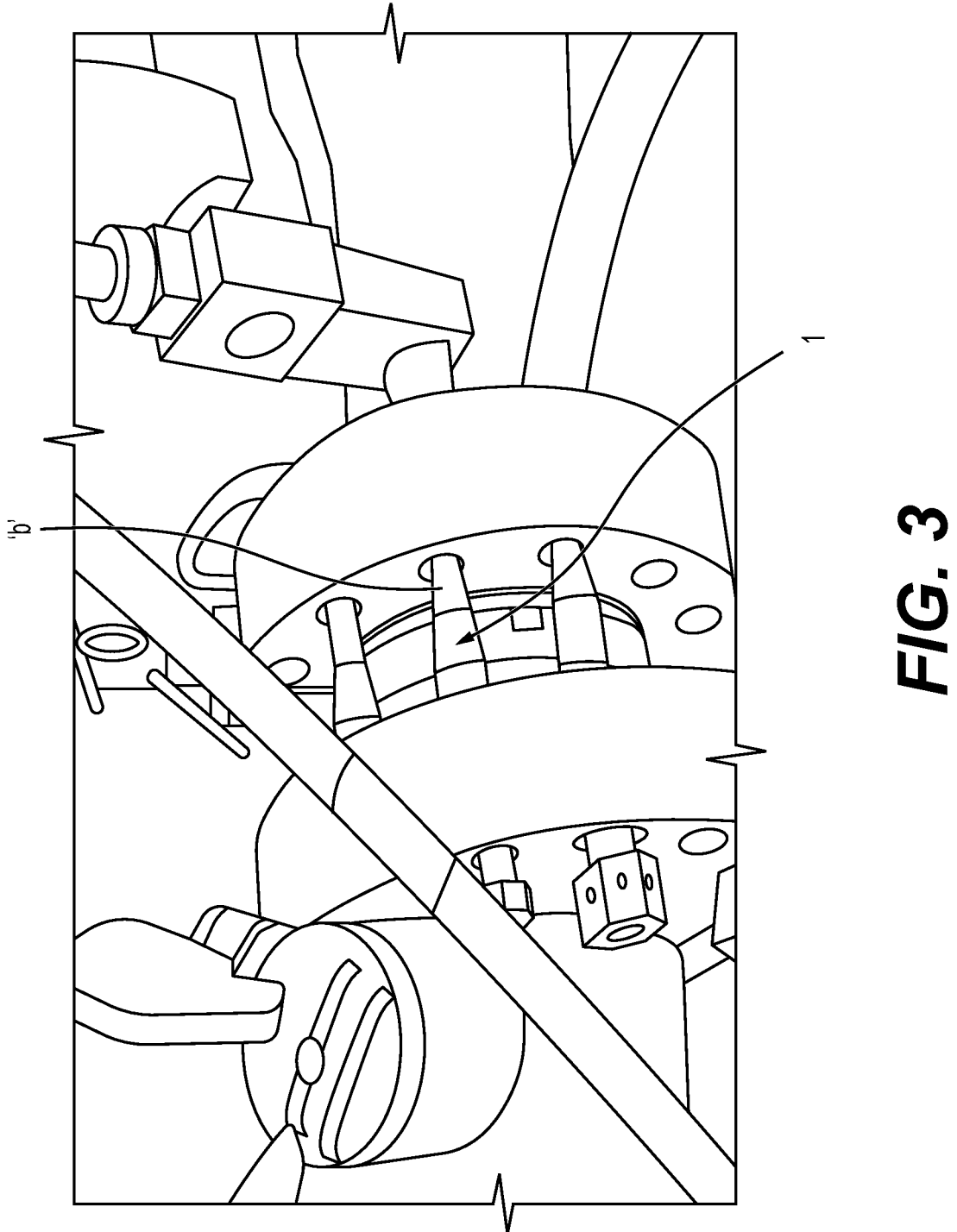
FIG. 3 is a demonstrative photograph of two flanged connections to the ends of two pipelines, with the device for removing misalignments being inserted between a pair of holes in the flanges to promote the alignment necessary to embody the connection between the pipelines.

Therefore, according to the graphic illustration provided by FIG. 3, it should be understood that the ROV holds the device 1 of the invention through the handle 3 and the larger diameter portion 'a'. The opposite portion, which is the smaller diameter portion 'b', still without positioning the movable nut 5, is inserted through the hole in the flange of the first pipeline to be interconnected, passing through this first hole in order to find a corresponding hole in the flange of the second pipeline to be interconnected. The gradual reduction 'c' in the central region of the elongated body 2 assists in the "sliding" of the device 2, until a position wherein a minimum portion of the terminating end of the smaller diameter portion 'b' is identified, where the device 1 already will have passed through both holes in the flanges to be interconnected. At this minimum available end, then, the ROV must fit the movable nut 5 and proceed with the torque that continues to motivate the passage of the device through the holes of the flanges to be interconnected. In particular, it is observed that the passage of the device caused by the torque of the movable nut 5, in fact, implies the tendency to position the holes of both flanges to be interconnected in the portion with the larger diameter 'a'. Once it is identified that the hole of the first flange and the hole of the second flange to be interconnected have passed through gradual reduction and are positioned in the larger diameter portion 'a', there is concluded the operation of removing the previously existing axial and/or longitudinal misalignments. Next, once the holes in the flanges of the interconnecting pipelines are aligned, the appropriate stud screws selected for that particular operation are inserted, which will find an aligned condition of the pipelines. Finally, the device 1 is removed and replaced with the appropriate stud screw.

Having defined the preferred embodiments of this matter, a technician skilled on the subject observes that modifications can be made based on the technique described herein, which are further encompassed by what describes and claims the present invention.

The invention claimed is:

1. A device for removing misalignments between flanges, the device comprising:
   an elongated body, the elongated body comprises a larger diameter and a smaller diameter; and
   a manipulator fixed to a first end of the elongated body, wherein:

a second end that terminates the elongated body in the smaller diameter comprises threads configured to receive a movable element,
   the first end terminates the elongated body in the larger diameter and is configured to receive a fixed element such that, the fixed element is positioned before the manipulator relative to the first end, and
   the device is configured to correct radial misalignments or longitudinal misalignments identified between holes of flanges at ends of two pipelines.

2. The device according to claim 1, wherein the device comprises a metallic material.

3. The device according to claim 1, wherein the larger diameter gradually changes to the smaller diameter at a central region of the elongated body and comprises a conical shape.

4. The device according to claim 1, wherein the movable element comprises a movable nut and the fixed element comprises a fixed nut.

5. The device according to claim 1, wherein the manipulator comprises a bar.

6. The device according to claim 5, wherein the bar of the manipulator is configured to be engaged by a remotely operated vehicle (ROV).

7. The device according to claim 6, wherein the device is positioned by the ROV when the ROV is engaged with the bar of the manipulator.

8. The device according to claim 1, wherein:
   the fixed element is attached to the first end; and
   the fixed element and the manipulator occupy less than half a length of the larger diameter of the elongated body.

9. The device according to claim 8, wherein:
   the device is configured to be inserted through the diameter of a hole in a first flange initially by the smaller diameter and without positioning the movable element, in order to find a corresponding hole in the flange of a second pipeline to be interconnected; and
   the movable element is configured to be inserted into a minimum available portion of the smaller diameter after passing through two holes of the flanges to be interconnected.

10. The device according to claim 9, wherein the movable element configured to be torqued until the two holes of the flanges to be interconnected are positioned in the larger diameter of the elongated body.

11. The device according to claim 10, wherein the movable element is configured to be torqued by a remotely operated vehicle (ROV).

12. The device according to claim 8, wherein more than half the length of the larger diameter is free to pass through a hole of a flange.

13. The device according to claim 1, wherein the device is configured to be used in a subsea environment.

14. The device according to claim 1, wherein the larger diameter of the elongated body is approximately equal to a diameter of a hole in the flanges.

15. The device according to claim 1, wherein the smaller diameter of the elongated body is approximately equal to half the diameter of the larger diameter of the elongated body.

16. The device according to claim 1, wherein the first end that terminates the elongated body in the larger diameter comprises threads configured to receive the fixed element and/or the manipulator.

17. The device according to claim 1, wherein the movable element is configured to be screwed onto the threads of the first end of the elongated body.

18. A device for removing misalignments between flanges, the device comprising:

an elongated body, the elongated body comprises a larger diameter and a smaller diameter; and a manipulator fixed to a first end of the elongated body, wherein:

a first end that terminates the elongated body in the smaller diameter and comprises threads configured to receive a movable element, and the first end terminates the elongated body in the larger diameter and is configured to receive a fixed element such that, the fixed element is positioned before the manipulator relative to the first end.

19. The device according to claim 18, wherein the larger diameter of the elongated body is approximately equal to a diameter of a hole in the flanges.

20. A device for removing misalignments between flanges, the device comprising:

an elongated body, the elongated body comprises a larger diameter and a smaller diameter; and a manipulator fixed to a first end of the elongated body, wherein:

a first end that terminates the elongated body in the smaller diameter and comprises threads configured to receive a movable element, the first end terminates the elongated body in the larger diameter and is configured to receive a fixed element such that, the fixed element is positioned before the manipulator relative to the first end, and wherein the smaller diameter of the elongated body is approximately equal to half the diameter of the larger diameter of the elongated body.

* * * * *